United States Patent Office 3,008,830
Patented Nov. 14, 1961

3,008,830
PROCESS OF MODIFYING DRIED MILK
William C. Winder, Madison, Wis., and Douglas Herbert Bullock, Guelph, Ontario, Canada, assignors to Wisconsin Alumni Research Foundation, Madison, Wis., a corporation of Wisconsin
No Drawing. Filed Nov. 18, 1960, Ser. No. 70,141
5 Claims. (Cl. 99—56)

The present invention relates to a process of treating dried milk including dried milk products during the latter stages of the drying operation, and more specifically to a process for providing and retaining dried milk containing milk fat including dried whole milk with increased "sinkability."

It is well known that dried milk containing milk fat such as whole milk powder is relatively difficult to disperse in water when it is desired, for example, to reconstitute the dry powder into a liquid reconstituted milk product. This is due primarily to the fact that the dry milk powder has poor wettability and self-dispersion in that the powder tends to float on the water and does not sink readily or after being physically dispersed may tend to rise to the surface of the water. Many attempts have been made to improve the sinkability of dried milk as it is known that dried milk with good sinkability along with good solubility can be readily dispersed in water to form a stable homogeneous product. These attempts for the most part have been directed to modifications in the drying operation itself including the use of different drying temperatures, etc. The rapid chilling or cooling of the milk immediately after drying has also been proposed. The formation of aggregates or coarse agglomerates has more recently been proposed and while this approach has proved satisfactory for use with non-fat milk solids (skim milk) it has not provided a satisfactory product for use with whole milk or milk containing milk fat. See Louder et al. Patent 2,832,686 and particularly column 6, lines 36-46 of the Louder et al. patent which talks about the necessity of using warm water with agglomerated whole milk and specifically water warmed sufficiently to melt the fat ". . . since the butter fat must be melted before the powder disperses readily."

In investigations in this field it has been determined that the wettability of whole milk powder varies with the temperature of storage, powder stored at 85° F., for example, exhibiting poorer wettability than powder stored at 45° F. In investigations in this field it also has been determined, that wettability or self-dispersion of dry whole milk powder is greatly affected by the powder, as well as the water, temperature. The heating above 85° F. of whole milk powder stored at temperatures in the range of 45° F. to 85° F. for example, has been found to improve wettability. Also, whole milk powder at 120° F. has been found to have better self-dispersion than powder at 76° F. Post-drying heat treatments of milk powder containing milk fat have thus been determined to increase wettability and self-dispersion, but heretofore this increased and highly desired property in all cases has been found to disappear, i.e. is lost, upon subsequent cooling and storage of the powder. The present invention is directed to this problem, and specifically to providing a treatment which will improve sinkability, wettability or self-dispersion and at the same time retain this improvement upon cooling of the dried milk. The present invention is also directed to retaining the increased sinkability after cooling during storage.

We have discovered that the increased sinkability obtained upon heating dried milk containing milk fat can be retained upon cooling of the dried milk and maintained in the dried milk providing (1) that the dried milk is subjected to a heat treatment adequate to melt all of the milk fat, (2) that the dried milk with the milk fat in the liquid state is held for an adequate time, (3) that the resulting hot dried milk is cooled to certain temperatures and (4) that the cooled dried milk is maintained below certain temperatures. These steps are discussed in detail below.

*Heating step.*—In the process of the present invention dried milk containing milk fat (or milk during the latter stages of the drying operation) is heated to a temperature above the melting point of the milk fat and held at this temperature until all of the fat is melted, i.e. is in liquid form. Temperatures of about 45–50° C. (113–122° F.) are in the preferred range. Lower temperatures down to about 37° C. (e.g. about 98–100° F.) can be employed although as the lower temperatures take longer times to melt the fat and insure that all of the fat is in liquid form, temperatures below about 40° C. (about 105° F.) are outside the preferred range. Higher temperatures, e.g. 60–70° C. or above, can also be employed in this step but as temperatures of 45–50° C. are adequate to rapidly melt the fat and insure that all of the fat is in liquid form, temperatures much above about 65° C. (149° F.) are also ordinarily outside the preferred range. In addition to the fact that the use of higher temperatures results in no added beneficial effect, their use is ordinarily avoided due to tendency of the higher temperatures to deleteriously affect the overall taste of the milk powder which is particularly noticeable when the powder is reconstituted in water.

*Holding time.*—The heat treatment is continued by holding the dried milk at the same temperature or any of the temperatures noted above at which the fat will be maintained in liquid form, until the dried milk is stabilized or conditioned in a sense that the increased sinkability resulting from the heat treatment will be locked into the dried milk when it is cooled as noted below. This time can be readily ascertained by determining the sinkability of a sample of the hot dried milk and determining the sinkability of a sample of the hot dried milk when cooled quickly to about 6° C., and then stopping the heat treatment when the cooled sample exhibits substantially about the same sinkability as the hot sample in water at about 25° C. Preferably, the heat treatment is continued until the dried milk has attained maximum increased sinkability and the maximum sinkability resulting from the heat treatment will be locked into the dried milk when it is properly cooled. This time can be readily ascertained by determining the sinkabilities of samples of the hot dried milk at successive time intervals during the heat treatment until there is no further increase in sinkability, i.e. until the increase stops and maximum sinkability has been attained, and the sinkability of the sample of the hot dried milk, which exhibits maximum sinkability, when cooled quickly to about 6° C. exhibits substantially about the same sinkability as the hot sample. One of the preferred ways of obtaining comparative sinkability data is by adding a specified amount of dried milk powder, e.g. 500 mg., to a specified amount of water at 25° C. in a separatory funnel type apparatus, allowing the powder to remain in contact with the water for a specified time, e.g. 0.5–3.0 minutes, then separating the water containing that portion of the powder that had sunk from the powder which remained on the surface of the water, and determining the amount of solids in the water, i.e. the amount of powder that sank in the water. If 400 mg. of the 500 mg. sample is found in the water, the sinkability of the sample can be assigned the value of 80 percent.

The required times that the dried milk with its fat in liquid form should be held at the elevated temperatures involves a time-temperature relationship and will vary with the temperatures employed as well as the processing conditions employed in the drying operation used to dry the milk. The optimum holding time at any temperature with any dried milk, however, can be readily ascertained as pointed out above by comparing the sinkability of the hot powder and preferably powder which has attained maximum sinkability, before cooling, in water at a specified temperature below the melting point of the fat, e.g. 25° C. or room temperature, with the sinkability of the powder, after cooling, in water at the same temperature. If the sinkability of the cooled powder is substantially less than the sinkability of the hot powder before cooling it shows that the holding time has not been sufficient to lock in the sinkability characteristic and therefore that the holding time should be increased. Holding times normally run from about 8–18 minutes at 45–50° C. down to about 1 minute at 65° C. and about 0.5 minute at 70° C.

*Cooling step.*—The hot dried milk after the completion of the heat treatment is then cooled with cool air or refrigerating means such as cool plates or combinations of the same down to at least about 10° C. (50° F.). The cooling step is best carried out promptly but it can go over a period (e.g. not to exceed one hour at room temperature) if the dried milk is not agitated, i.e. is maintained in a quiescent state. Preferably, the dried milk is cooled quickly after completion of the heat treatment down to about 6° C. (e.g. about 40–45° F.) or below without agitation and with rapid cooling from 40° C. to 20° C.

*Storage.*—The cooled dried milk should be maintained in storage below about 20° C. (68° F.) and preferably at the cooling temperatures of about 6–10° C. The reason for this is that the dried milk starts to lose its increased sinkability at approximately 22° C. (about 72° F.) and it is completely lost at 32° C. (about 90° F.).

The following example will serve to illustrate the invention.

*Example*

Dry whole milk which has been dried in thin films is exposed in a layer about ⅛ inch thick to moving air at about 45° C. (113° F.) for about 18 minutes with the milk maintained in the quiescent state. At this time maximum sinkability has been attained and the sinkability of the hot powder is about the same as the sinkability of a sample of the hot powder cooled quickly to about 6° C. The hot powder maintained in the quiescent state is then cooled rapidly with cold air to 6° C. (about 43° F.) and stored at this temperature. The resulting product has greatly increased sinkability in both cold and warm water over the untreated product and this property is retained and maintained as long as the treated product is kept below about 20° C. (e.g. about 68–70° F.).

We have discovered, under the conditions specified in the above example (i.e. exposing dry whole milk which has been dried in thin films and while in layers about ⅛ inch thick to heated moving air) that the time-temperature relationship, i.e. the minimum time for a specified temperature, can be expressed by the following formula:

$$X = 65.25 - 16.23 \log Y$$

where X is temperature in ° C. and Y is time in minutes. Under the conditions specified by this formula the treated milk has at least about 75 percent sinkability in 0.5 minute in water at 25° C.

We do not fully know what happens during the critical holding period although it is believed that the surface energy of the hot fat pulls the fat (which may be in the form of films) into globules and that this results in the exposure of protein, lactose and mineral molecules which are highly hydrophilic. It is also believed that some orientation takes place betwen the melted fat molecules and the other molecules including the protein molecules and that this orientation also involves hydrophilic groups. The increased sinkability, for example, can be explained by the exposure of the water-receptive hydrophilic molecules as well as by the orientation of hydrophilic groups outwardly where they are readily available to the water. If the hydrophilic groups, either by exposure or orientation or a combination of the same, are involved as it appears they must be, the process of the present invention "locks" the rearranged fat into position and thus prevents the loss of the increased sinkability by the covering up of hydrophilic groups with fat or by their reorientation on cooling.

We have also discovered that the dried milk tends to lose a substantial part of the increased sinkability built into the milk during the heat treatment if the milk is not maintained quiet, i.e. in a quiescent state, during the cooling step. This is particularly critical during the period when the temperature of the dry milk reaches about 104° F. (40° C.) and is dropped during the cooling step to about 68° F. (20° C.). In the quiescent state the particles of dry milk may be moved around from one point to another, e.g. on a conveyor belt, but have no "contact motion" in a sense that they undergo no rubbing action such as occurs during agitation or tumbling of the particles. Transportation of the dried milk while cooling by ordinary commercial means such as by vacuum lines, air pressure sweeping, augers and the like involve drastic contact motion and thus result in loss of sinkability. For optimum results we have also discovered that the dry milk should preferably be maintained in the quiescent state during the heating step or at least during the latter stage of the holding time in the heating step.

The reasons for the above are not fully understood at the present time. However, based upon our investigations it is believed that contact motion, due to its rubbing action, exposes and smears milk fat around or over the particles, and thus destroys the increased sinkability built into the particles by the heat treatment before it is locked in by the cooling treatment.

Investigations have shown the process of the present invention to be particularly adaptable for use with whole milk dried in thin films, with whole milk which is puffed in vacuum drying or puffed with an inert gas, and with spray dried whole milk which has been aggregated, e.g. dampened with steam and redried with air. These milk powders have a high surface area compared to volume and are of the type preferred for use in the process of the present invention, which, for example, can be used to advantage to improve the sinkability of aggregated or agglomerated whole milk powders prepared in accordance with the processes of the Pebbles Patent 2,835,586 or the Louder et al. patent, supra. The process of the present invention, however, is effective on other dry products containing fat, e.g. spray and roll dried milks, powdered creams, malted milk, dried ice cream mix, dried soups, dried cheeses, etc., but usually in a lesser degree. As noted above the process of the present invention can be profiled into the latter stages of the drying operation and be used with a dried (drying) milk product containing, for example, about 10 percent moisture as well as be used any time after the drying operation with a dried milk product ordinarily containing 2–3 percent or less moisture. The term "dried milk" covers both types of products.

This application is a continuation-in-part of our co-pending application Serial No. 718,155, filed February 28, 1958.

We claim:

1. A process for increasing the sinkability of dried milk containing milk fat which comprises heating the dried milk until all of the milk fat in the milk is in liquid form, holding the resulting hot milk with the fat in liquid form until a sample of the milk when cooled quickly to about 60° C. exhibits substantially the same sinkability as a sample of the hot milk when both samples are tested in water at about 25° C., cooling the resulting hot milk to at least about 10° C. with rapid cooling while maintaining the milk in a quiescent state from at least about 40° C. to 20° C., and maintaining the cooled milk below about 20° C.

2. The process of claim 1 where the dried milk during the heat treatment is heated to about 40 to 65° C. and the hot treated milk during the cooling treatment is cooled rapidly while maintained in a quiescent state, and the cooled milk during storage is maintained at about 6 to 10° C.

3. The process of claim 2 where the dried milk is obtained by drying whole milk in thin films and the resulting dried milk in a layer about ⅛ inch thick is exposed to moving air at a temperature X for a minimum time Y specified by the equation:

$$X = 65.25 - 16.23 \log Y$$

where X is temperature in ° C. and Y is time in minutes.

4. The process of claim 3 where the dried whole milk is exposed to moving air at about 45° C. for about 18 minutes.

5. A process for increasing the sinkabiilty of dried whole milk and retaining the increased sinkability upon cooling and during storage, which comprises heating the dried milk to about 45 to 50° C. until all of the milk fat in the milk is in liquid form, continuing the heat treatment while maintaining the fat in liquid form with milk in a quiescent state, stopping the heat treatment when maximum sinkability is attained and a sample of the dried milk cooled quickly to about 6° C. exhibits substantially the same sinkability as a sample of the hot milk when both samples are tested in water at about 25° C., then quickly cooling the hot milk while maintained in the quiescent state to about 6° C., and maintaining the cooled milk at about 6° C. during storage.

References Cited in the file of this patent

UNITED STATES PATENTS

| | | |
|---|---|---|
| 2,663,644 | Hansen | Dec. 22, 1953 |
| 2,832,686 | Louder et al. | Apr. 29, 1958 |
| 2,911,301 | Winder et al. | Nov. 3, 1959 |

UNITED STATES PATENT OFFICE
CERTIFICATE OF CORRECTION

Patent No. 3,008,830                 November 14, 1961

William C. Winder et al.

It is hereby certified that error appears in the above numbered patent requiring correction and that the said Letters Patent should read as corrected below.

Column 4, line 69, for "60° C." read -- 6° C. --.

Signed and sealed this 17th day of April 1962.

(SEAL)
Attest:
ESTON G. JOHNSON
Attesting Officer

DAVID L. LADD
Commissioner of Patents